United States Patent [19]

Verkouw

[11] 4,185,042
[45] Jan. 22, 1980

[54] COUPLING AGENT

[75] Inventor: Hendrik T. Verkouw, Amsterdam, Netherlands

[73] Assignee: Shell Oil Company, Houston, Tex.

[21] Appl. No.: 934,296

[22] Filed: Aug. 17, 1978

[30] Foreign Application Priority Data

Dec. 29, 1977 [GB] United Kingdom ............... 54147/77

[51] Int. Cl.$^2$ ............................................. C08L 43/04
[52] U.S. Cl. ........................................ 525/332; 526/19; 526/20; 526/21; 526/29; 526/55; 525/333; 525/334; 525/342; 525/385
[58] Field of Search ..................... 260/827; 526/19, 20, 526/21, 29, 55

[56] References Cited

U.S. PATENT DOCUMENTS

| | | | |
|---|---|---|---|
| 3,244,664 | 4/1966 | Zelinski et al. ........................ | 526/29 |
| 3,468,972 | 9/1969 | Hsieh ..................................... | 260/836 |
| 3,470,226 | 9/1969 | Plumb et al. ........................ | 260/448.8 |
| 3,692,874 | 9/1972 | Farrar et al. ........................ | 526/29 |
| 3,725,369 | 4/1973 | Halasa et al. ........................ | 526/29 |
| 3,840,616 | 10/1974 | Clark et al. ........................ | 260/827 |
| 3,880,954 | 4/1975 | Kable et al. ........................ | 260/879 |

*Primary Examiner*—Allan Lieberman
*Attorney, Agent, or Firm*—Dean F. Vance

[57] ABSTRACT

Lithium metal-terminated polymers of one or more conjugated dienes and of one or more monoalkenyl arenes are coupled by reaction with a coupling agent of the general formula

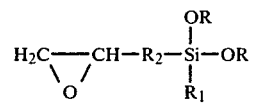

where the R groups are optionally substituted hydrocarbyl groups, $R_1$ is hydrogen, R or OR, and $R_2$ is an optionally substituted alkylene group which may contain one or more oxygen atoms.

10 Claims, No Drawings

COUPLING AGENT

BACKGROUND OF THE INVENTION

The coupling of lithium metal-terminated polymers is a process known in the art. In accordance with this known process, a lithium metal-terminated polymer is treated with a compound having two or more functional groups containing two or more reactive sites capable of reacting with the carbon-lithium metal bonds of the lithium metal-terminated polymer. In many cases the multifunctional coupling agent thereby becomes a nucleus for the resulting structure. From this nucleus long chain polymeric branches radiate and such coupled polymers have specific properties that render then useful for particular applications.

A wide variety of coupling agents are known. U.S. Pat. No. 3,244,664 discloses the use of certain silicic compounds including silicon tetrachloride and a limited group of silanes and siloxanes. U.S. Pat. No. 3,281,383 discloses the use of multifunctional coupling agents having three or more reactive sites. The types of multifunctional coupling agents disclosed therein include polyepoxides, polyisocyanates, polyimines, polyaldehydes, polyketones, polyanhydrides, polyesters, polyhalides and mixtures thereof. Similar coupling agents are disclosed in U.S. Pat. No. 3,468,972. The use of silicic coupling agents are further disclosed in U.S. Pat. No. 3,692,874 and U.S. Pat. No. 3,880,954. The latter patent is specifically concerned with the use of a trimethoxymethyl silane coupling agent. A novel coupling agent has now been found that combines a high coupling efficiency with the ability to form both linear and radial polymers.

SUMMARY OF THE INVENTION

The present invention broadly encompasses a process for the production of a polymer comprising reacting a living lithium-terminated polymer having the formula P-Li wherein P is selected from the group consisting of polymer chains of one or more alkadienes having 4–12 carbon atoms and copolymer chains of one or more alkadienes having 4–12 carbon atoms and one or more monoalkenyl arenes of 8–18 carbon atoms, having the alkenyl radical attached to an arene ring carbon atom, with a coupling agent of the general formula

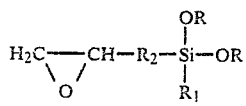

where the R groups are optionally substituted hydrocarbyl groups, $R_1$ is selected from the group consisting of hydrogen, —R and —OR, and $R_2$ is an optionally substituted alkylene group which may contain one or more oxygen atoms.

DETAILED DESCRIPTION OF THE INVENTION

The preferred group of acyclic conjugated alkadienes that can be polymerized into the polymer chain P are those containing 4–8 carbon atoms. Examples for such alkadienes are 1,3-butadiene, 2,3-dimethyl-1,3-butadiene, piperylene, 3-butyl-1,3-octadiene, isoprene, and 2-phenyl-1,3-butadiene.

Monoalkenyl arenes that can be polymerized together with the alkadienes to form the polymer chain P preferably are those selected from the group consisting of styrene, the methylstyrenes, particularly 3-methylstyrene, the propylstyrenes, particularly 4-propylstyrene, vinylnaphthalene, particularly 1-vinylnaphthalene, cyclohexylstyrenes, particularly 4-cyclohexylstyrene, p-tolystyrene, and 1-vinyl-5-hexylnaphthalene.

The polymer chains P can be homopolymers of the alkadiene monomers defined or can be copolymers of alkadiene monomers and monoalkenyl-substituted aromatic monomers. These copolymers, in turn, can be random or tapered copolymers, as well as block copolymers of these various monomers. The presently preferred monomers are isoprene, 1,3-butadiene and styrene. The presently preferred polymer chains P are those in which the conjugated dienes are present in a major amount and the monovinyl-substituted arenes are present in a minor amount.

The presently preferred polymer is one that is obtained by coupling a living lithium metal-terminated polymer selected from the group consisting of homopolymers of alkadienes having 4 to 12 carbon atoms and copolymers of at least one alkadiene of 4 to 12 carbon atoms and at least one monoalkenyl-substituted arene of 8 to 18 carbon atoms.

The molecular weight of the polymers of this invention can vary in broad ranges. For the usual applications of the coupled polymers, the number average molecular weight will be in the range of about 1,000 to about 2,000,000.

Those polymers in which the polymer chain P has a structure A—B— so that B is attached to the coupling agent, and in which A represents a block of monoalkenylarenes, preferably a polystyrene block, and B represents a block that confers rubbery properties to the polymer chain, such as a polyalkadiene block, a copolymer block of an alkadiene and a monoalkenyl-substituted arene, or a combination of such blocks constitutes a presently preferred polymer. Such a polymer exhibits properties both of an elastomer and of a thermoplastic polymer. Therefore, such polymers can be formed into articles by standard procedures known for producing articles from thermoplastic polymers while the finished article exhibits elastomeric properties.

Furthermore, specific polymers constituted preferred embodiments of this invention are those obtained by reactions and procedures disclosed in detail in the following description of a process to make these polymers.

In accordance with another embodiment of this invention, there is provided a process for making the polymers defined above which comprises a coupling reaction between a living polymer having the formula P-Li and a coupling agent as defined above, wherein Li is lithium metal and P is as described above.

The quantity of coupling agent employed with respect to the quantity of living polymers P-Li present depends largely upon the degree of coupling and the properties of the coupled polymers desired. Preferably the coupling agent defined above will be employed in a range of about 0.05 to about 4.0 preferably about 0.5 to about 2.0 moles of coupling agent per mole of polymer.

Preferred coupling agents are silicon compounds represented by the general formula

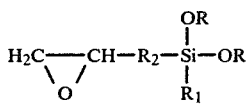

wherein the R groups which may be the same or different, represent optionally substituted hydrocarbyl groups; $R_1$ represents a H-atom or a R or —OR group; and $R_2$ represents an optionally substituted alkylene group which may be interrupted by one or more hereroatoms such as oxygen or nitrogen atoms.

Suitable R groups are alkyl, cycloalkyl, aryl, alkaryl or aralkyl, in particular those groups having from 1 to 20 carbon atoms. Preferred R groups are $C_1$ to $C_{10}$ alkyl groups, in particular methyl groups. Preferably $R_1$ is a —OR group. Suitably the $R_2$ group is a group of formula —$R_3$—O—$R_4$—wherein $R_3$ and $R_4$ are optionally substituted alkylene groups. Preferably $R_3$ represents a $C_1$ to $C_3$ alkylene group, more preferably a methylene group, and $R_4$ represents a $C_1$ to $C_{17}$ alkylene group, more preferably a $C_1$ to $C_{10}$ alkylene group, most preferably a propylene group.

Specific examples of suitable silicon compounds include beta-glycidioxyethyl-trimethoxy silane, gamma-glycidoxylpropyl-trimethoxy silane; gamma-glycidoxypropyl-triethoxy silane; delta-glycidoxybutyl-dimethoxy ethoxy silane; gamma-glycidyl-oxypropyltriphenoxy silane; gamma-glycidoxypropyl-methyl-dimethoxy silane, and beta-(3,4-epoxycyclohexyl)-ethyl-trimethoxy silane.

One advantage of the silicon compounds as herein defined is that they have a high coupling efficiency. Usually more than 90% of the alkali-metal polymers are coupled.

One advantage of the preferred silicon compounds i.e. those containing three —OR groups and one epoxide group is that it is possible, simply by varying the amounts thereof, to couple two or more alkali-metal terminated polymers. Although mixtures of linear and radial polymers are usually formed it is possible for example, by using higher amounts of the silicon compound to favor the formation of linear polymers and by using lower amounts to favor the formation of radial polymers.

The temperature at which the coupling reaction is carried out can vary over a broad range and, for convenience, often is the same as the temperature of polymerization. Although the temperature can vary broadly from about 0° to 150° C., it will preferably be within the range from about 20° C. to 100° C.

The coupling reaction is normally carried out by simply mixing the coupling agent, neat or in solution, with the living polymer solution. The reaction period is usually quite short. The normal duration of the coupling reaction will be in the range of 1 minute to 1 hour. Longer coupling periods may be required at lower temperatures.

After the coupling reaction, the coupled polymers are recovered by treating the reaction mixture with terminating agents containing active hydrogens such as alcohols or water or aqueous acid solutions or mixtures thereof. It is usually preferred to add an antioxidant to the reaction mixture before isolation of polymer.

The polymer is separated from the reaction mixture by standard techniques, such as steam stripping or coagulation with a suitable non-solvent such as an alcohol. The coagulated or stripped polymer is then removed from the resulting medium by, e.g., centrifugation or extrusion. Residual solvent and other volatiles can be removed from the isolated polymer by heating, optionally under reduced pressure or in a forced air flow.

Compounding ingredients such as fillers, dyes, pigments, softeners and reinforcing agents can be added to the polymer during compounding operations.

In accordance with a further embodiment of this invention, there is provided a process for producing the polymers as defined above. This process includes basically two steps. The first step is the step in which a living polymer having the formula P-Li is produced. The second step is that in which this living polymer is coupled with the coupling agent of this invention as defined above.

The first step of this process is carried out by reacting a mono-functional lithium metal initiator system with the respective monomer or monomers to form the living polymer chain P-Li. This polymerization step can be carried out in one step or in a sequence of steps. In the case where the polymer chain P is a homopolymer or a random or tapered copolymer of two or more monomers, the monomers are simultaneously polymerized with the lithium metal initiator. In the case where the polymer chain P is a block copolymer comprising two or more homo- or copolymer blocks, these individual blocks can be generated by incremental or sequential monomer addition.

The monomers that are generally employed, as well as the monomers that are preferably used have been defined above in connection with the novel polymers of this invention. These monomers are also preferred for the process of the present invention.

The lithium metal-based initiator systems used in the first step of the process to make the coupled polymers of this invention are based on lithium having the general formula R'Li wherein R' is a hydrocarbyl radical of 1 to about 20 carbon atoms. Examples of such lithium initiators are methyllithium, isopropyllithium, n-butyllithium, sec-butyllithium, t-octyllithium, n-dodecyllithium, n-eicosyllithium, phenyllithium, naphthyllithium, p-tolyllithium, 4-phenylbutyllithium, cyclohexyllithium, and 4-cyclohexylbutyllithium. The amount of the lithium metal initiator employed depends upon the desired properties of the polymer, particularly the desired molecular weight. Normally the organomonolithium initiator is employed in the range of about 0.1 to 100 gram millimoles per 100 grams of total monomers.

The polymerization reaction is carried out in the presence of a hydrocarbon diluent. Preferably the hydrocarbon diluent is a paraffinic, cycloparaffinic or aromatic hydrocarbon having 4–10 carbon atoms or a mixture of such diluents. Examples for the diluent are n-hexane, n-heptane, 2,2,4-trimethylpentane, cyclohexane, benzene and toluene. The reaction is generally carried out with a weight ratio of diluent to monomers exceeding 1. Preferably the diluent is employed in a quantity between about 400 to about 1500 parts by weight per 100 parts by weight of total monomers.

The polymerization reaction in step 1 usually occurs within a period of time ranging from a few minutes up to about 6 hours. Preferably, the reaction is carried out within a time period of about 10 minutes to about 2 hours. The polymerization temperature is not critical and will generally be in a range of about 15° to about 150° C., preferably in a range of about 40° to about 90° C.

At the conclusion of the polymerization in order to carry out the second coupling step, the polymerization mixture is blended with the coupling agent. This is done before any material that would terminate the polymerization reaction and that would remove the lithium metal atom from the polymer chain is added to the reaction mixture. Thus the blending of the polymerization mixture and the coupling agent is carried out before any material such as water, acid or alcohol, is added to inactivate the living polymer. The second step of coupling the living polymer is thus carried out as described in detail above.

Various materials are known to be detrimental to the lithium metal-initiated polymerization. Particularly, the presence of carbon dioxide, oxygen, water and alcohols should be avoided during an organomonolithium-initiated polymerization reaction of step 1 of this combined process for making the coupled copolymers. Therefore, it is generally preferred that the reactants, initiators and the equipment be free of these materials and that the reaction is carried out under an inert gas such as nitrogen.

The invention is further illustrated by reference to the following Illustrative Embodiments which are given for the purpose of illustration only and are not meant to limit the invention to the particular reactants and conditions employed.

ILLUSTRATIVE EMBODIMENTS 1-5

Four lithium-terminated polymers were prepared in a stirred autoclave, under nitrogen, in the following manner:

(a) Lithium-terminated polymer A

A lithium-terminated polystyrene-polybutadiene block copolymer was prepared by first polymerizing a solution of styrene (300 g) in cyclohexane (2700 g). Polymerization was initiated by adding to the solution 95 ml of 200 mmole/liter solution of secondary butyl lithium in cyclohexane. The polymerization was continued for 30 minutes at 40° to 50° C. after which substantially all of the styrene had reacted. A solution of butadiene (700 g) in cyclohexane (2300 g) was then added to the polymerization mixture and the polymerization continued for a further 60 minutes at 70° C. after which substantially all of the butadiene had reacted.

(b) Lithium-terminated polymer B

A further lithium-terminated polystyrene-polybutadiene block copolymer was prepared as described above using 225 g of styrene and 695 g of butadiene.

(c) Lithium-terminated polymer C

A further lithium-terminated polystyrene-polybutadiene block copolymer was prepared as described above using 325 g of styrene and 745 g of butadiene.

(d) Lithium-terminated polymer D

A lithium-terminated polybutadiene homopolymer was prepared by polymerizing a solution of butadiene (900 g) in cyclohexane (5000 g). Polymerization was initiated by adding to the solution 85 ml of a 200 mmole/liter solution of secondary butyl lithium in cyclohexane. The polymerization was continued for 75 minutes at 70° C. after which substantially all of the butadiene had reacted.

Samples of the above polymer solutions were steam-stripped, after the addition of a sterically hindered phenolic anti-oxidant (0.2 phr), and the molecular weights of the dry polymers determined (apparent GPC peak molecular weights on polystyrene scale). The results are given in Table 1.

The remaining solutions of the above polymers were then reacted with gamma-glycidoxypropyl-trimethoxysilane (GPTS; Illustrative Embodiments 1 to 5) in cyclohexane solution (250 mmole per liter) for 30 minutes at 65° C. For comparative purposes polymers B and C were reacted, under the same conditions, with methyltrimethoxysilane (MTS; Examples $C_1$ and $C_2$), a known coupling agent.

The "coupled" polymer solutions so prepared were steam-stripped, after the addition of a sterically hindered phenolic anti-oxidant (0.2 phr), and the coupling efficiency (i.e. the amount of coupled polymers prepared) determined. The molecular weights of the dry polymers were determined (as described above) and the apparent degree of branching of the polymers calculated (i.e. the molecular weight of the coupled polymer divided by the molecular weight of the lithium-terminated polymer). The results are given in Table 1.

TABLE 1

| Example | GPTS or MTS sec.butyllithium (molar ratio) | Coupling Efficiency (%) | Molecular weights Lithium-terminated polymer type | $MW(10^3)$ | "Coupled" polymer $MW(10^3)$ | Apparent degree of branching |
| --- | --- | --- | --- | --- | --- | --- |
| 1 | 0.5 | 94 | A | 80 | 170 | 2.1 |
| 2 | 0.4 | 93 | B | 68 | 160 | 2.4 |
| 3 | 0.33 | 90 | B | 68 | 190 | 2.8 |
| 4 | 0.25 | 90 | C | 85 | 260 | 3.1 |
| 5 | 0.29 | 91 | D | 96 | 285 | 3.0 |
| $C_1$ | 0.5 | 92 | B | 68 | 135 | 2.0 |
| $C_2$ | 0.33 | 80 | C | 85 | 170 | 2.0 |

What is claimed is:

1. A process for the production of a polymer comprising reacting one mole of a living lithium-terminated polymer having the formula P-Li wherein P is selected from the group consisting of polymer chains of one or more alkadienes having 4-12 carbon atoms and copolymer chains of one or more alkadienes having 4-12 carbon atoms and one or more monoalkenyl arenes of 8-18 carbon atoms, having the alkenyl radical attached to an arene ring carbon atom, with from about 0.05 to about 4.0 moles of a coupling agent of the general formula:

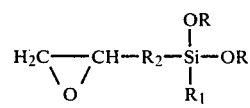

where the R groups are hydrocarbyl groups selected from the group consisting of alkyl, cycloalkyl, aryl alkaryl or aralkyl groups having from 1 to 20 carbon atoms; $R_1$ is selected from the group consisting of hydrogen, R and OR; and $R_2$ is selected from the group consisting of alkylene groups and a group of the formula —$R_3$—O—$R_4$—wherein $R_3$ and $R_4$ are alkylene groups.

2. A process according to claim 1 where R is a $C_1$ to $C_{10}$ alkyl group.

3. A process according to claim 1 wherein $R_1$ is an OR group.

4. A process according to claim 1 wherein $R_2$ has the formula $R_3$—O—$R_4$ where $R_3$ is a $C_1$ to $C_3$ alkyl group and $R_4$ is a $C_1$ to $C_{17}$ alkyl group.

5. A process according to claim 2 wherein R is a methyl group.

6. A process according to claim 1 wherein the coupling agent is gamma-glycidoxypropyl-trimethoxysilane.

7. A process according to claim 1 wherein said alkadiene is selected from the group consisting of isoprene and butadiene and said monoalkenyl arene is styrene.

8. A process according to claim 1 wherein P is a polymer chain of one or more alkadienes selected from the group consisting of butadiene and isoprene.

9. A process according to claim 1 wherein P is a block copolymer of styrene and butadiene with the butadiene block being attached to the lithium ion.

10. The polymer produced by the process of claim 1.

* * * * *